(12) United States Patent
Jeran et al.

(10) Patent No.: US 6,628,412 B1
(45) Date of Patent: Sep. 30, 2003

(54) METHODS OF DOCUMENT MANAGEMENT AND AUTOMATED DOCUMENT TRACKING, AND A DOCUMENT MANAGEMENT SYSTEM

(75) Inventors: Paul L. Jeran, Meridian, ID (US); Terry P. Mahoney, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/369,381

(22) Filed: Aug. 5, 1999

(51) Int. Cl.[7] .............................................. G06K 15/00
(52) U.S. Cl. ...................................... 358/1.14; 358/1.1
(58) Field of Search .................................. 358/1.1, 1.14, 358/1.18, 1.13, 1.16, 540, 401; 380/201, 202, 203, 246; 382/176, 181, 190

(56) References Cited

U.S. PATENT DOCUMENTS

| | | | |
|---|---|---|---|
| 4,243,694 A | 1/1981 | Mansukhani | |
| 5,093,147 A | 3/1992 | Andrus et al. | |
| 5,735,547 A | 4/1998 | Morelle et al. | |
| 5,853,197 A | 12/1998 | Mowry, Jr. et al. | |
| 5,987,127 A | * 11/1999 | Ikenoue et al. | 358/401 |

OTHER PUBLICATIONS

USSN: 09/326072; File date: Jun. 4, 1999; Title: Methods Of Obtaining Listings Of Information From Databases; Moore, K.
USSN: 09/325910; File date: Jun. 4, 1999; Title: Methods Of Storing And Retrieving Information, And Methods Of Document Retrieval; Moore, K.; HP PDNO: 10990146–1.
USSN: 09/326090; File date: Jun. 4, 1999; Title: Methods Of Storing And Retrieving Communications, Information, And Documents; Kirshenbaum, E.; HP PDNO: 10990157–1.

* cited by examiner

Primary Examiner—Arthur G. Evans

(57) ABSTRACT

In one aspect, the invention encompasses a method of document management. A document is printed with a printing device configured to automatically label the document with a machine-readable code. The machine-readable code contains information, and the printing device is in data communication with a database so that the information contained in the machine-readable code on the document is also recorded in the database. The document is scanned with a scanning machine configured to extract at least some of the information from the machine-readable code. Subsequently, some of the information extracted from the machine-readable code by the scanning machine is compared with information in the database to track the document. In another aspect, the invention encompasses a document management system. Such system comprises a printing device configured to print text on documents as well as to automatically print machine-readable code on the documents. The system further comprises a database in data communication with the printing device, and which records the information printed in machine-readable code on the documents. Additionally, the system comprises a scanning machine configured to scan documents and extract at least some information from the machine-readable code, and a processor configured to compare information extracted by the scanning machine with information in the database.

10 Claims, 1 Drawing Sheet

METHODS OF DOCUMENT MANAGEMENT AND AUTOMATED DOCUMENT TRACKING, AND A DOCUMENT MANAGEMENT SYSTEM

FIELD OF THE INVENTION

The invention pertains to automated document management systems, and to methods of utilizing such systems.

BACKGROUND OF THE INVENTION

Modern computing methods enable documents to be produced rapidly and profusely. Such methods also enable several versions of a document to be stored in a database, and numerous users to work on the stored document versions. In many applications, it is desirable to track which user was responsible for the last update of a particular version of a document. It would be desirable to develop automated systems to enable such tracking.

Among the modern devices which have enabled the proliferation of documents is the copy machine. Many offices allow their workers relatively unrestricted access to copy machines, as it is becoming increasingly necessary for persons to make copies of documents to enhance their productivity, and/or to maintain records of transactions occurring as part of their employment. Frequently, the copier is linked with an entry code system, and each employee is provided with a unique identification recognized by the entry code system. The employees are required to input the unique identification before making copies, which enables a company to at least monitor the number of copies generated by each employee. In more advanced systems, the employees also input an identification of the project they are working on to enable a company to track costs associated with particular projects.

A difficulty of having relatively free employee access to copy machines can be in preventing copying of sensitive documents. Sensitive documents can include, for example, trade secret information, employee payroll information, or company checks. Generally, a company will have a few persons authorized to make copies of some or all of the sensitive documents, and the remainder of the employees are not so authorized. A common method for avoiding the copying of sensitive documents by unauthorized employees is to limit access to the documents. However, circumstances occur wherein employees who are not authorized to copy particular sensitive documents nonetheless have access to the documents. It would therefore be desirable to develop new methods of protecting sensitive documents from being copied by unauthorized persons.

SUMMARY OF THE INVENTION

In one aspect, the invention encompasses a method of document management. A document is printed with a printing device configured to automatically label the document with a machine-readable code. The machine-readable code contains information, and the printing device is in data communication with a database so that the information contained in the machine-readable code on the document is also recorded in the database. The document is scanned with a scanning machine configured to extract at least some of the information from the machine-readable code. Subsequently, some of the information extracted from the machine-readable code by the scanning machine is compared with information in the database to track the document.

In another aspect, the invention encompasses a document management system. Such system comprises a printing device configured to print text on documents as well as to automatically print machine-readable code on the documents. The system further comprises a database in data communication with the printing device, and which records the information printed in machine-readable code on the documents. Additionally, the system comprises a scanning machine configured to scan documents and extract at least some information from the machine-readable code, and a processor configured to compare information extracted by the scanning machine with information in the database.

DETAILED DESCRIPTION OF THE INVENTION

Figure 1:
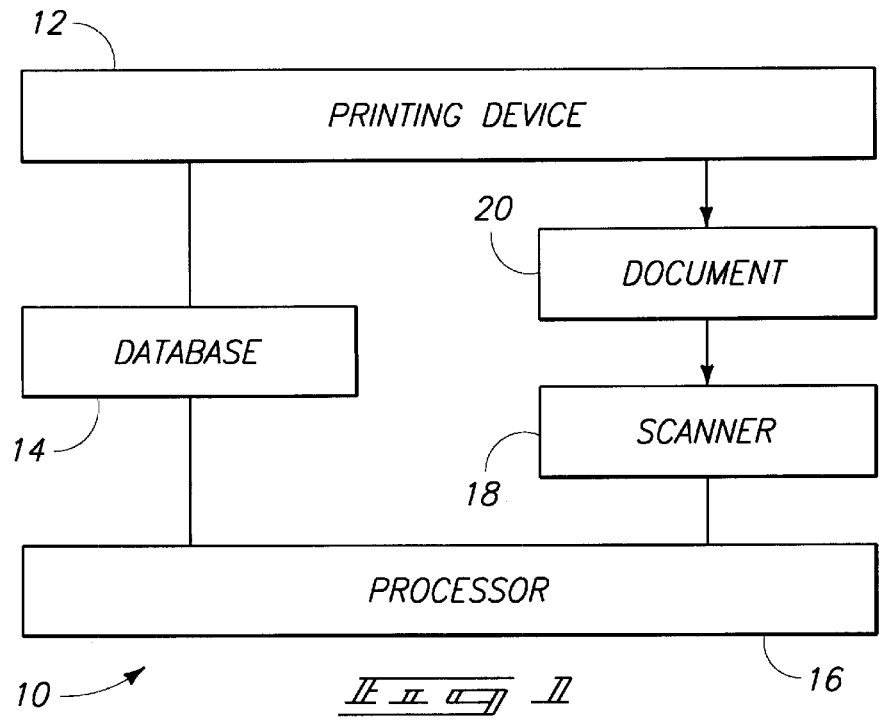
FIG. 1 is a diagrammatic block diagram of a first embodiment system encompassed by the present invention.

The invention encompasses automated methods of document management. A first embodiment system 10 encompassed by the present invention is described with reference to the block diagram of FIG. 1. System 10 comprises a printing device 12 in data communication with a database 14. Database 14 is also in data communication with a processor 16, which in turn is in data communication with a scanning machine (scanner) 18. Database 14 can, for example, be either onboard processor 16, or stored on a network separate from processor 16 and to which processor 16 is in data communication. Also, although database 14 is shown as a singular database, it is to be understood that database 14 can comprises a single location of data storage, or plurality of separate locations of data storage. In particular applications, database 14 can comprise a network, such as, for example, the global network commonly referred to as the "Internet". Further, it is to be understood that although processor 16 is shown as singular processor, such can comprise a plurality of separate processors.

Database 14 can contain, for example, a list of the various users having access for utilizing printing device 12, and/or a list of the various projects that such users are working on. For instance, database 14 can contain listings of (1) the version numbers of documents printed by device 12, (2) the authors of the documents, (3) file names of the documents, and (4) storage locations of files corresponding to the documents.

Printing device 12 is configured to print an image on a medium upon receiving appropriate input. Once printing device 12 prints such image it generates a document 20. The instructions to print the image can be received from database 14, or from another input (not shown). The above-described image which is printed on document 20 will be referred to herein as a "primary" image. Such primary image is the image that would be generated by any conventional printing process, and can comprise graphics and/or text. In addition to printing the primary image, printing device 12 is further configured to provide a machine-readable code on document 20. Such machine-readable code serves to label document 20 for further document tracking, and contains information retrieved from database 14. The information can comprise, for example, a description of the version number of the document, an identification of the author of the document, a filename of the document, and/or a storage location of a data file corresponding to the document. The machine-readable code can further define the persons, if any, authorized to copy document 20.

Numerous methods are available for providing a machine-readable code on document 20. One class of methods is to hide the code within the primary image. Such can be accomplished by utilizing particular digital encoding, such as, for example, font pattern modifications, including, half-tone screen, inter-character spacing modification, and dithering patterns. Another method is to place the machine-readable code on a portion of document 20 that is not normally printed upon with a primary image. Such portion can include, for example, one or more of the corners of document 20. The machine-readable code can be stored in such portion as, for example, a pattern of dots or lines. Such pattern could, for example, have the appearance of a bar code. In particular applications, the machine-readable code could be printed with an ink that is not visible in the range of human vision when viewed with only light of the visible wavelength range. The printed ink would therefore appear "invisible" unless the document were viewed under a light outside of the visible wavelength range. Suitable inks having the property of being visible to humans only when viewed with light outside of the visible wavelength range include, for example, inks described in U.S. Pat. Nos. 5,093,147 and 4,243,694.

The above-described methods of forming machine-readable code on a document can be readily utilized by persons of ordinary skill in the art by combining conventional technologies.

After document 20 is generated by printing device 12, it can be scanned with scanning machine 18 configured to determine if machine-readable code is present, and to extract at least some of the information contained in the machine-readable code when the code is present. The extracted information is then sent to processor 16 which compares the information with information in database 14 to enable document 20 to be tracked. For instance, if two versions of document 20 are found, and if the information contained in document 20 contains, for example, authorship and version number, then the versions can be analyzed by scanner 18 to determine which of the two is a later version. The analysis could also determine if either of the two documents is a copy.

Another embodiment of the invention is described with reference to a system 50 in FIG. 2. In referring to system 50, identical numbering to that utilized above in describing system 10 will be used where possible, with differences indicated utilizing numerals greater than 50. System 50, like the above-described system 10, comprises a printing device 12, a database 14 and a processor 16, and generates a document 20 from printing device 12. Also, like the system 10 described above, system 50 utilizes printing device 12 to provide a machine-readable code on document 20 while printing a primary image on document 20. System 50 differs from the above-described system 10 in that the scanner of system 50 is configured as a scanner/image-forming-device construction 52, which can be utilized to generate output documents 54 in response to scanning document 20. Output documents 54 are illustrated in a dashed line, to indicate that a decision can be made by a processor to determine if output documents 54 will be generated.

The image-forming-device of component 52 can be, for example, a copier or a printer. A first aspect of the invention is described assuming that the image-forming-device of component 52 is a copier (and thus that component 52 is a scanner/copier), and that the output documents are copies.

The scanning machine portion of scanner/copier construction 52 extracts information from the machine-readable code provided on document 20 by printer 12, and sends such information to processor 16. Processor 16 then ascertains if copying of document 20 is authorized, and if so, enables the copier portion of scanner/copier construction 52 to form copies. If, on the other hand, processor 16 determines that copying of document 20 is not authorized, it does not enable copies to be made.

In particular embodiments, an authorization code is provided in a machine-readable code format that will not be reproduced upon copying of document 20. In such embodiments, the scanner/copier construction 52 can be configured to not copy a document unless the scanning machine portion extracts information authorizing such copying from the machine-readable code. For instance, the authorization can be in the form of individual dots or lines printed at a resolution higher than that achievable by most copiers. Accordingly, if the original document is copied, the lines or dots will become blurred together, and at least some of the information in the machine-readable code will not be reproduced by a copying machine. If such non-reproduced code contained the authorization to copy the document, the processor would prevent the copied document from being recopied. Another method of preventing reproduction of an authorization code on copied documents is to print the code with a tonal difference that cannot be reproduced with a copier. Yet another method of preventing reproduction of an authorization code on copied documents is to print the code in an ink invisible to the light utilized in a copier.

In addition to, or as an alternative to, preventing the copying of copies, the machine-readable code can be utilized to prevent unauthorized copying of original documents. For instance, the machine-readable code can define particular groups of users authorized to copy document 20, and other groups not so authorized, and thus function as a block to unauthorized copying. For particularly sensitive documents, the machine-readable code could prevent any copying of a document by any users. In particular applications, the information in database 14 comprises one or both of a listing of machine-readable codes indicating authorization to copy a document, and a listing of machine readable codes indicating that a document is not authorized to be copied. The scanning machine portion of scanner/copier construction 52 extracts information from the machine-readable code provided on document 20 by printer 12, and sends such information to processor 16. Processor 16 then compares the extracted information with one or both of the above-described listings in database 14 to ascertain if copying of document 20 is authorized, and if so, enables the copier portion of scanner/copier construction 52 to form copies. If, on the other hand, processor 16 determines that copying of document 20 is not authorized, it does not enable copies to be made.

In the shown embodiment, the scanning machine and copier are illustrated as a common construction referred to as a scanner/copier construction. It is to be understood, however, that the invention encompasses constructions wherein the scanning machine is separate from the copying machine. Also, although the embodiment is described in an application wherein information from the scanner is passed to processor 16, which is in turn in data communication with database 14, the invention encompasses other embodiments (not shown) wherein the scanner (scanning machine) is in data communication with a processor which is not in further communication with database 14. Such processor can be preconfigured to recognize portions of the machine-readable code generated by printing device 12 that define authorization for making copies. The shown embodiment can, however, offer advantages over said other embodiments. For instance, the shown method can enable database 14 to selectively identify user groups authorized for copying a particular document. In such applications, the machine-readable code can contain information which defines only a particular group of users authorized to make copies from a document. Also, the scanner/copier construction 52 can be configured such that persons wishing to make copies first enter an identification code. Such code can then be passed to processor 16 along with the authorization identifier information from document 20. Processor 16 can then be utilized to compare the user identification code obtained from scanner/copier construction 52, and copier authorization information extracted from document 20, with information on database 14 to determine if the particular user is authorized to copy the particular document.

In a particular application of the invention, the scanner/copier construction 52 can be further configured to record the number of copies generated by particular individuals as a record in a data file. Such could be particularly valuable in applications in which, for example, royalties were to be paid on a per document basis.

It is noted that the printing device 12 and copy machine 52 of system 50 can be incorporated into a common device. In such application, the device could be configured to print a machine-readable code on copies that are formed, as well as on documents that are printed. The machine-readable code on copies could be different from that on printed documents, to assist in distinguishing copies from original documents.

A specific example of how the present invention can be utilized is as follows. Consider that there is law firm responsible for generating a contract for a client, and that the law firm has a single partner and several associates working on the project. Each time a contract is printed, a machine-readable code is automatically provided on the document identifying who within the law firm generated the contract, as well as identifying the version number, and the date that the contract was printed, and further identifying the law firm. If, for some reason, multiple similar versions of the contract are found, the machine readable code can be scanned and processed to identify which of the multiple versions is the most recent version of the contract, and which, if any, had been generated by the partner. Further, the machine-readable code can contain information which authorizes only certain persons to copy the contract, with such information being provided in a form which will be destroyed upon making a single copy. Accordingly, if a copy should be generated for some illicit purpose, such document can be identified as a copy (rather than as an original document) merely by passing the document through a scanning machine.

Among the applications for which the methodology of the present invention can be incorporated are: (1) logging and possibly charging for copies; (2) verification that a document being copied is the most recent version of the document on record, and if the document is not the most recent version, the copying machine can be configured to ask a user if a more recent copy should be printed and copied; (3) verification that a copy can be printed and is not confidential; and (4) determination of whether a document is an original or a copy.

Figure 2:
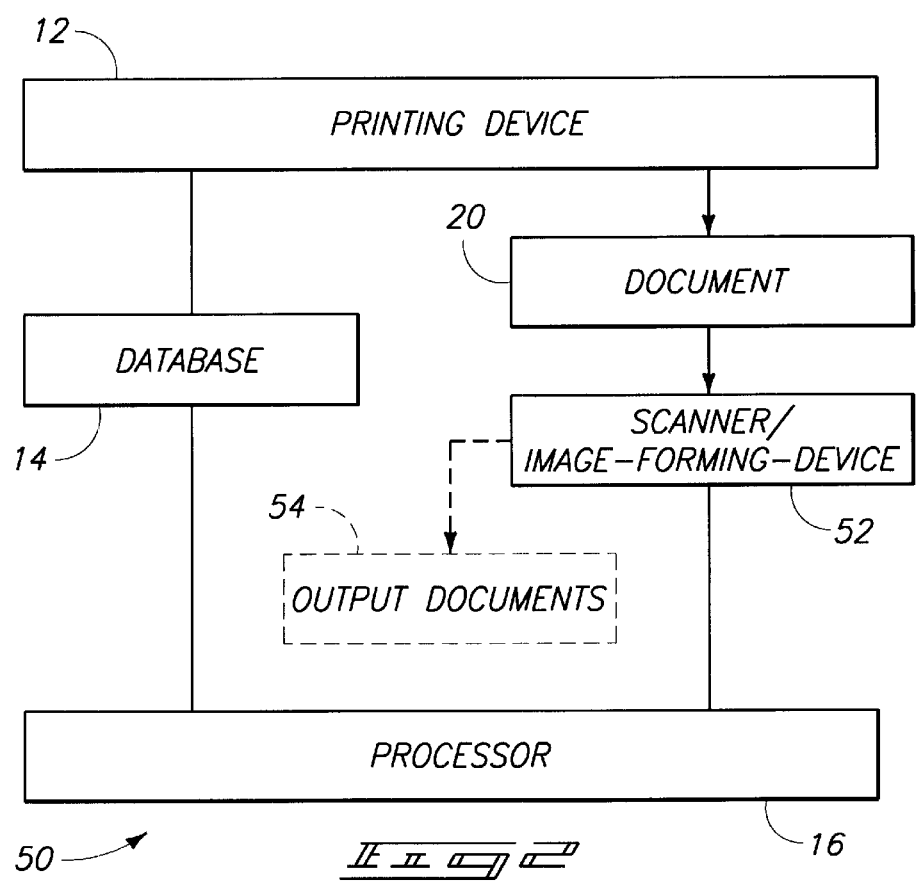
FIG. 2 is a diagrammatic block diagram of a second embodiment system encompassed by the present invention.

Another aspect of the invention is described assuming that scanner/image-forming-device 52 of FIG. 2 is a scanner/printer. In describing such aspect, it is to be understood that a digital representation of document 20 can be stored on database 14. The digital representation corresponds to an electronic representation of document 20 and can be in any file format. The digital representation can, for example, be an electronic file encoding document 20 and which, when sent to printing device 12, results in document 20 being printed. It is also to be understood that multiple versions of document 20 can be electronically stored in database 14. In the aspect in which component 52 is a scanner/printer, processor 16 can be configured to determine which of the versions of document 20 was input into scanner/printer 52, and to determine that other versions of document 20 have digital representations stored in database 14. Processor 16 can be further configured to enable other versions of document 20, besides the scanned version to be output in response to scanning a version of document 20. For instance, processor 16 could be configured to cause only the most recent versions of document 20 stored in database 14 to be output as output documents 54, regardless of whether the scanned document 20 corresponds to the most recent version stored in database 14. Alternatively, processor 16 could be configured to determine if multiple versions of a scanned document are present in database 14, and, if multiple versions are found, to prompt a user to identify which of the multiple versions is to be output as output document 54.

What is claimed is:

1. A method of automated document tracking, comprising:

generating a primary image on a document with either a printer or a first copying machine;

printing a machine-readable code on the document as it is generated; the machine-readable code containing information, the printing device being in data communication with a database so that the information printed in machine readable code on the document is also recorded in the database;

scanning the document with a scanning machine configured to determine if the machine readable code is present on the document and further configured to extract at least some of the information from the machine-readable code;

comparing the information extracted from the machine-readable code by the scanning machine with the information in the database to track the document; and wherein the scanning machine is linked with a processor that is in data communication with the database and in data communication with a second printer, wherein the information contained in the machine-readable code defines a version of the document, wherein a digital representation of the scanned version of the document is stored on the database together with digital representations of other versions of the document, and wherein the processor is configured to determine that digital representations of said other versions of the document are in the database, the processor being configured to enable either the scanned version of the document or at least one of said other versions of the document stored in the database as digital representations to be printed by the second printer.

2. The method of claim 1 wherein the scanning machine is linked with a second copying machine configured for copying the document, wherein the information contained in the machine-readable code defines if the document can be copied, and wherein the second copying machine is configured to copy the document unless the scanning machine finds machine-readable code on the document and extracts information from the machine-readable code not authorizing the copying.

3. The method of claim 1 wherein the scanning machine is linked with a second copying machine configured for copying the document, wherein the information contained in the machine-readable code defines if the document can be copied, and wherein the second copying machine is configured to not copy the document unless the scanning machine finds the machine-readable code on the document and extracts information from machine-readable code authorizing the copying.

4. The method of claim 3 wherein the machine-readable code is configured such that it will not be fully reproduced on any copies formed by copying the original document with the second copying machine.

5. The method of claim 4 wherein the machine-readable code is printed with at least one of a resolution or tonal difference that cannot be reproduced by the second copying machine.

6. The method of claim 4 wherein the machine-readable code is printed with an ink that is not visible when viewed with only light in the visible wavelength range, said ink becoming visible when stimulated with light outside of the visible wavelength range.

7. The method of claim 3 wherein the machine-readable code is configured such that it is reproduced on copies formed by copying the original document with the second copying machine.

8. The method of claim 3 wherein the second copying machine is configured with a second printing device that prints a new machine-readable code on any copies formed from the document.

9. The method of claim 3 wherein the document is generated with the first copying machine, and wherein the second copying machine and the first copying machine are the same copying machine.

10. The method of claim 3 wherein the second copying machine is configured to identify a user requesting a copy of the document, wherein the information contained in the machine-readable code defines if the document can be copied by particular users, and wherein the second copying machine is configured to not copy the document unless the scanning machine finds the machine-readable code and extracts information from the machine-readable code authorizing the copying by the user identified by the second copying machine as requesting a copy of the original document.

* * * * *